United States Patent
Abe (10) Patent No.: US 10,601,078 B2
(45) Date of Patent: Mar. 24, 2020

(54) METHOD OF PRODUCING LITHIUM ION SECONDARY BATTERY

(71) Applicant: TOYOTA JIDOSHA KABUSHIKI KAISHA, Toyota-shi, Aichi-ken (JP)

(72) Inventor: Machiko Abe, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 134 days.

(21) Appl. No.: 15/702,235

(22) Filed: Sep. 12, 2017

(65) Prior Publication Data
US 2018/0097253 A1  Apr. 5, 2018

(30) Foreign Application Priority Data
Oct. 5, 2016  (JP) .................. 2016-197160

(51) Int. Cl.
| | |
|---|---|
| H01M 10/058 | (2010.01) |
| H01M 4/62 | (2006.01) |
| H01M 4/13 | (2010.01) |
| H01M 4/139 | (2010.01) |
| H01M 10/04 | (2006.01) |
| H01M 4/04 | (2006.01) |
| H01M 4/48 | (2010.01) |
| H01M 10/0525 | (2010.01) |
| H01M 10/0568 | (2010.01) |
| H01M 4/02 | (2006.01) |

(52) U.S. Cl.
CPC ....... *H01M 10/058* (2013.01); *H01M 4/0404* (2013.01); *H01M 4/13* (2013.01); *H01M 4/139* (2013.01); *H01M 4/48* (2013.01); *H01M 4/62* (2013.01); *H01M 10/049* (2013.01); *H01M 10/0525* (2013.01); *H01M 10/0568* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2014/0308578 A1* | 10/2014 | Onizuka | ........... | H01M 10/0567 429/188 |
| 2015/0004474 A1* | 1/2015 | Lee | ..................... | H01M 10/446 429/163 |

FOREIGN PATENT DOCUMENTS

| | | |
|---|---|---|
| JP | 2013-089445 A | 5/2013 |
| JP | 2015-041567 A | 3/2015 |
| JP | 2016-039030 A | 3/2016 |

* cited by examiner

*Primary Examiner* — Sarah A. Slifka
(74) *Attorney, Agent, or Firm* — Sughrue Mion, PLLC

(57) ABSTRACT

A method of producing a lithium ion secondary battery includes preparing an alkaline negative electrode composite material including a negative electrode active material, a binder, an alkaline component, and an aqueous solvent; adding an oxalate complex lithium salt that is acidic in the aqueous solvent to the alkaline negative electrode composite material; and applying the negative electrode composite material to which the oxalate complex lithium salt is added to a surface of a negative electrode current collector and drying the negative electrode composite material to form a negative electrode active material layer.

10 Claims, 3 Drawing Sheets

METHOD OF PRODUCING LITHIUM ION SECONDARY BATTERY

INCORPORATION BY REFERENCE

The disclosure of Japanese Patent Application No. 2016-197160 filed on Oct. 5, 2016 including the specification, drawings and abstract is incorporated herein by reference in its entirety.

BACKGROUND

1. Technical Field

The present disclosure relates to a method of producing a lithium ion secondary battery.

2. Description of Related Art

In recent years, nonaqueous electrolyte solution secondary batteries such as a lithium ion secondary battery have been used as so-called portable power sources for personal computers and mobile terminals, and power sources for driving a vehicle. A lithium ion secondary battery of this type includes, for example, a positive electrode in which a positive electrode active material layer is formed on a surface of a foil type positive electrode current collector and a negative electrode in which a negative electrode active material layer is formed on a surface of a foil type negative electrode current collector, and is produced when an electrode body including the positive electrode and the negative electrode is housed in a battery case together with a nonaqueous electrolyte solution (for example, Japanese Patent Application Publication No. 2016-39030 (JP 2016-39030 A).

In order to increase a capacity retention rate of the lithium ion secondary battery described above when stored for a long time, a solid electrolyte interface (SEI) coating is formed on a surface of the negative electrode active material. When the SEI coating is formed on the surface of the negative electrode active material, the negative electrode is stabilized and decomposition of the nonaqueous electrolyte solution is prevented. Therefore, it is possible to increase the capacity retention rate. However, when the SEI coating is formed, since lithium ions serving as charge carriers in the electrolyte solution are consumed, an oxalato complex lithium salt (lithium bis(oxalato)borate: such as LiBOB) that decomposes at a lower potential than the nonaqueous electrolyte solution and serves as a material for the SEI coating is added to the nonaqueous electrolyte solution (for example, Japanese Patent Application Publication No. 2013-89445 (JP 2013-89445 A) and Japanese Patent Application Publication No. 2015-41567 (JP 2015-41567A)).

SUMMARY

Incidentally, in the technique for forming an SEI coating by adding an oxalate complex lithium salt in the above, in order to form the SEI coating more appropriately, the change of an addition destination of the oxalate complex lithium salt from the nonaqueous electrolyte solution to the negative electrode active material layer has been studied in recent years. In particular, in a lithium ion secondary battery (hereinafter referred to as "5 V series battery") in which a so-called high potential positive electrode active material having an operating voltage of 4.7 V or higher is used, in order to prevent oxidative decomposition of the nonaqueous electrolyte solution in the positive electrode, a fluorinated solvent is used as a solvent for the nonaqueous electrolyte solution. However, in the fluorinated solvent, the solubility of the oxalate complex lithium salt is significantly lower than in a non-fluorinated solvent. Therefore, the establishment of technique for changing an addition destination of the oxalate complex lithium salt from the nonaqueous electrolyte solution to the negative electrode active material layer is strongly desired.

However, when the oxalate complex lithium salt is added to the negative electrode active material layer, the negative electrode active material layer easily separates from the negative electrode current collector, and thus it may be difficult to form the negative electrode.

The present disclosure provides a method of producing a lithium ion secondary battery through which, even if an oxalate complex lithium salt is added to a negative electrode active material layer, the negative electrode active material layer does not separate from the negative electrode current collector, and an SEI coating derived from the oxalate complex lithium salt can be appropriately formed on the surface of the negative electrode active material.

A method of producing a lithium ion secondary battery according to an aspect of the present disclosure includes preparing an alkaline negative electrode composite material including a negative electrode active material, a binder, an alkaline component, and an aqueous solvent, adding an oxalate complex lithium salt that is acidic in the aqueous solvent to the alkaline negative electrode composite material, and applying the negative electrode composite material to which the oxalate complex lithium salt is added to a surface of the negative electrode current collector and drying the negative electrode composite material to form a negative electrode active material layer.

The inventors have investigated methods for preventing separation of a negative electrode active material layer according to the addition of an oxalate complex lithium salt. First, the inventors investigated the reason for the separation of the negative electrode active material layer. As a result, it was found that, when an oxalate complex lithium salt is added to a negative electrode composite material which is a precursor of the negative electrode active material layer, the negative electrode composite material becomes acidic, a binder in the negative electrode composite material is decomposed, and the negative electrode active material layer easily separates due to decomposition of the binder. Then, based on this finding, the inventors conceived that, if the acid generated when the oxalate complex lithium salt is added can be neutralized, decomposition of the binder may be prevented, and the separation of the negative electrode active material layer may be able to be prevented, and thus conducted various studies and experiments regarding specific neutralization methods. First, as a neutralization method, the use of a binder that is adjusted to be alkaline in advance by adding an alkaline component may be considered. However, since the content of the binder in the negative electrode composite material is very small (10% or less of the total negative electrode composite material), if a pH of the binder is simply set to be alkaline, it is not possible to sufficiently neutralize the acid generated when the oxalate complex lithium salt is added, and it is difficult to sufficiently prevent the separation of the negative electrode active material layer. For this reason, increasing the content of the alkaline binder has been investigated. However, in this case, the content of the negative electrode active material in the negative electrode active material layer decreases and the battery performance may be degraded.

Here, in an aspect of the present disclosure, another method of neutralizing the acid generated when the oxalate complex lithium salt is added has been studied. Preparation of a negative electrode composite material (alkaline negative electrode composite material) with a pH that is adjusted to be alkaline before the oxalate complex lithium salt is added was conceived. Then, an experiment using this neutralization method was performed. As a result, it is confirmed that, when the alkaline negative electrode composite material is prepared, the acid generated when the oxalate complex lithium salt is added is appropriately neutralized, and decomposition of the binder in the negative electrode composite material can be sufficiently prevented. The production method disclosed here is based on the above finding, and includes a process of preparing an alkaline negative electrode composite material including a negative electrode active material, a binder, an alkaline component, and an aqueous solvent. Accordingly, regardless of the oxalate complex lithium salt being added to the negative electrode composite material, it is possible to sufficiently prevent decomposition of the binder and appropriately prevent separation of the negative electrode active material layer. Then, the SEI coating derived from the oxalate complex lithium salt is appropriately formed on a surface of the negative electrode active material, and it is possible to increase the capacity retention rate when the produced battery is stored for a long time. Here, in the production method disclosed here, even in a battery of a type in which a fluorinated solvent is used and an oxalate complex lithium salt is not easily added to a nonaqueous electrolyte solution, since the SEI coating derived from the oxalate complex lithium salt can be appropriately formed on a surface of the negative electrode active material, it is possible to contribute to increasing the capacity retention rate of the 5 V series battery for which a fluorinated solvent needs to be used.

In the method of producing a lithium ion secondary battery according to the aspect of the present disclosure, the alkaline component may be lithium hydroxide (LiOH). LiOH can be used as an alkaline component without inhibiting a charging and discharging reactions of the lithium ion secondary battery.

In the method of producing a lithium ion secondary battery according to the aspect of the present disclosure, the lithium hydroxide may be included at 0.01 wt % or more with respect to 100 wt % of the alkaline negative electrode composite material.

In the method of producing a lithium ion secondary battery according to the aspect of the present disclosure, the lithium hydroxide may be included at 0.02 wt % or more with respect to 100 wt % of the alkaline negative electrode composite material.

In addition, in the method of producing a lithium ion secondary battery according to the aspect of the present disclosure, the lithium hydroxide may be included at 0.02 wt % to 0.025 wt % with respect to 100 wt % of the alkaline negative electrode composite material. In this manner, when the amount of lithium hydroxide added is 0.02 wt % or more, it is possible to produce a negative electrode in which separation of the negative electrode active material layer is appropriately prevented and when the negative electrode composite material is applied to the surface of the negative electrode current collector, the effect of the oxalate complex lithium salt can be appropriately exhibited. On the other hand, when the amount of lithium hydroxide added exceeds 0.025 wt %, since the initial resistance of the produced battery may become higher, the amount is preferably 0.025 wt % or less.

In addition, in the method of producing a lithium ion secondary battery according to the aspect of the present disclosure, the oxalate complex lithium salt may be lithium bis(oxalato)borate. Since LiBOB can form an SEI coating with higher durability on the surface of the negative electrode active material, it is possible to exhibit the effect of the present disclosure to a greater degree.

In addition, in the method of producing a lithium ion secondary battery according to the aspect of the present disclosure, the lithium bis(oxalato)borate may be added to the alkaline negative electrode composite material so that the lithium bis(oxalato)borate is included at 0.025 M (mol/L) to 0.045 M (mol/L) with respect to the alkaline negative electrode composite material.

When the amount of LiBOB added is 0.025 M or more, since the SEI coating derived from LiBOB can be appropriately formed on the surface of the negative electrode active material, it is possible to greatly increase the capacity retention rate of the produced battery. On the other hand, when the amount of LiBOB added exceeds 0.045 M, since the initial resistance of the produced battery may become higher, the amount is preferably 0.045 M or less.

In addition, in the method of producing a lithium ion secondary battery according to the aspect of the present disclosure, the lithium bis(oxalato)borate may be added to the alkaline negative electrode composite material so that the lithium bis(oxalato)borate is included at 0.025 M (mol/L) to 0.04 M (mol/L) in the alkaline negative electrode composite material.

In addition, in the method of producing a lithium ion secondary battery according to the aspect of the present disclosure, in an initial charging process, the oxalate complex lithium salt included in the negative electrode active material layer may be electrically decomposed, and a solid electrolyte interface derived from the oxalate complex lithium salt may be formed on a surface of the negative electrode active material.

In addition, in the method of producing a lithium ion secondary battery according to the aspect of the present disclosure, in the initial charging process, the maximum achievable potential may be set to be higher than an oxidation-reduction potential of the oxalate complex lithium salt and lower than an oxidation-reduction potential of the nonaqueous electrolyte solution.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Preferred embodiments of the present disclosure will be described below. Here, components other than those particularly mentioned in the present disclosure that are necessary for implementation of the present disclosure can be recognized by those skilled in the art as design matters based on the related art in the field. The present disclosure can be implemented based on the content disclosed in this specification and common general technical knowledge in the field. Here, "A to B (A and B are arbitrary numbers)" in this specification indicates A or more and B or less.

Figure 1:
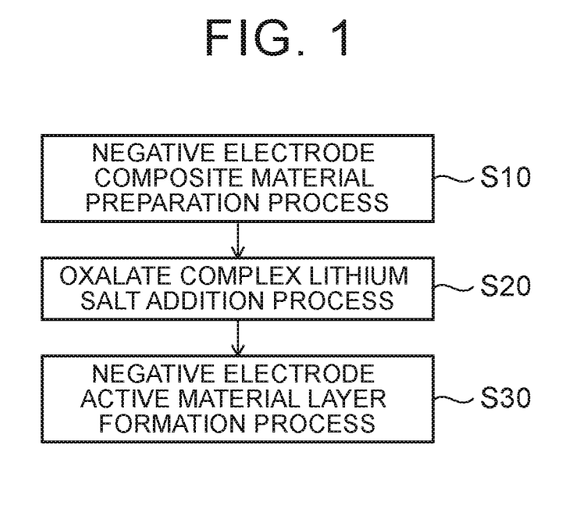
FIG. 1 is a flowchart showing production of a negative electrode in a method of producing a lithium ion secondary battery according to an embodiment of the present disclosure.

FIG. 1 is a flowchart showing production of a negative electrode in a method of producing a lithium ion secondary battery according to the present embodiment. As shown in FIG. 1, the method of producing a lithium ion secondary battery (hereinafter simply referred to as a "production method") according to the present embodiment includes a negative electrode composite material preparation process (S10), an oxalate complex lithium salt addition process (S20), and a negative electrode active material layer formation process (S30). The negative electrode is produced according to the above processes. The production of the negative electrode according to the production method in the present embodiment will be described below in detail.

A. Production of a Negative Electrode

1. In a negative electrode composite material preparation process in the production method according to the present embodiment, first, in the negative electrode composite material preparation process (S10), an alkaline negative electrode composite material including a negative electrode active material, a binder, an alkaline component, and an aqueous solvent is prepared.

In the present embodiment, the negative electrode active material is not particularly limited, and various materials that may be used as negative electrode active materials of a secondary battery of this type can be used alone or in a combination thereof (a mixture or a complex). As preferred examples of the negative electrode active material, graphite, hardly graphitizable carbon (hard carbon), easily graphitizable carbon (soft carbon), carbon nanotubes, or carbon materials having a structure of a combination thereof may be exemplified. For example, a graphite material of which surface is coated with amorphous carbon can be suitably used.

In addition, as the binder, a binder used for a lithium ion secondary battery of this type in the related art can be used. Specifically, styrene butadiene rubber (SBR), polytetrafluoroethylene (PTFE), a water soluble polymer material such as carboxymethyl cellulose (CMC) or a water dispersible polymer material such as polyvinylidene fluoride (PVDF), a halogenated vinyl resin such as polyvinylidene chloride (PVDC), polyethylene oxide (PEO), and the like can be used. Among the above polymer materials, since styrene butadiene rubber (SBR) is easily decomposed when the negative electrode composite material becomes acidic when the oxalate complex lithium salt is added, it can exhibit the effect of the production method according to the present embodiment more suitably.

In addition, as the aqueous solvent, water or a mixed solution mainly including water can be used. Here, when a mixed solution mainly including water is used, as long as the effect of the present disclosure is not significantly impaired, a mixed solution used for a lithium ion secondary battery of this type in the related art can be used.

In the present embodiment, when the above materials are mixed to prepare a paste-like negative electrode composite material, an alkaline component is added. As the alkaline component, a material exhibiting alkalinity when added to an aqueous solvent, for example, an alkali metal or alkaline earth metal hydroxide can be used. As a specific example of the alkaline component, lithium hydroxide (LiOH), sodium hydroxide (NaOH), and potassium hydroxide (KOH) can be used. In addition, a mixed system of these alkaline components can be used.

Among these alkaline components, in order to avoid inhibition of charging and discharging reactions of the lithium ion secondary battery, lithium hydroxide (LiOH) is particularly preferably used. Here, when LiOH is used as the alkaline component, if the amount of the prepared alkaline negative electrode composite material is set to 100%, an amount of LiOH added is preferably 0.01 wt % or more, and more preferably 0.02 wt % or more. Accordingly, it is possible to appropriately prevent the separation of the negative electrode active material layer and increase the capacity retention rate of the produced battery. In addition, when excess alkaline component is added, since the initial resistance of the produced battery increases, an amount of LiOH added is preferably 0.025 wt % or less.

Here, a timing at which the alkaline component is added is not particularly limited as long as it is before the oxalate complex lithium salt is added. For example, a negative electrode active material, a binder, an alkaline component, and an aqueous solvent may be mixed at the same time to prepare an alkaline negative electrode composite material. Alternatively, materials other than an alkaline component may be mixed to prepare a negative electrode composite material, and the alkaline component may be then added to the negative electrode composite material. Here, a procedure of adding an alkaline component is not particularly limited. For example, an alkaline component may be dissolved in some of the aqueous solvent in advance to prepare an alkaline solution, and the alkaline component in the alkaline solution may be mixed with other materials or a solid alkaline component may be directly added and mixed with other materials.

Thus, in this process, the above materials are weighed, and mixed using a stirring and mixing device in the related art such as a ball mill, a roll mill, a planetary mixer, a dispersing device, and a kneader. Accordingly, it is possible to prepare an alkaline negative electrode composite material with a pH that is adjusted to be alkaline in advance. In this case, it is preferable to adjust amounts of the materials so that the prepared alkaline negative electrode composite material has a pH in the range of 7.5 to 10 (preferably 7.5 to 9). When an alkaline negative electrode composite material with a pH that is adjusted to be within the above value range is used, it is possible to appropriately neutralize the acid generated when the oxalate complex lithium salt is added, which will be described below.

Here, in the negative electrode composite material preparation process, as long as the effect of the present disclosure is not significantly impaired, an additive used for a lithium ion secondary battery of this type in the related art can be added in addition to the above materials. For example, a thickener such as carboxymethyl cellulose (CMC) and methylcellulose (MC), and a dispersant can be appropriately added.

2. Oxalate Complex Lithium Salt Addition Process

In the oxalate complex lithium salt addition process (S20), an oxalate complex lithium salt that is acidic in an aqueous solvent is added to the above alkaline negative electrode composite material. As the oxalate complex lithium salt, a complex compound in which at least one oxalate ion ($C_2O_4^{2-}$) forms a coordinate bond with a central element (referred to as a coordination atom) can be used. As the central element, for example, a semi-metallic element such as boron (B) and phosphorus (P), may be exemplified. As a specific example, a compound having a tetracoordinate structural part in which at least one oxalate ion ($C_2O_4^{2-}$) is coordinated with boron (B) as a central atom, for example, lithium bis(oxalato)borate ($Li[B(C_2O_4)_2]$; LiBOB), lithium difluoro oxalate borate ($Li[BF_2(C_2O_4)]$; LiDFOB); and a compound having a hexacoordinate structural part in which at least one oxalate ion ($C_2O_4^{2-}$) is coordinated with phosphorus (P) as a central atom, for example, lithium tris (oxalato)phosphate ($Li[P(C_2O_4)_3]$), and lithium difluorobis (oxalato)phosphate ($Li[PF_2(C_2O_4)_2]$; LPFO) may be exemplified.

Here, among the above oxalate complex lithium salts, LiBOB is preferably used since it can be used to form an SEI coating with higher durability on the surface of the negative electrode active material. Here, when LiBOB is added, it is preferable to adjust an amount of LiBOB added so that LiBOB is included at 0.025 M to 0.045 M (preferably 0.025 M to 0.04 M) with respect to the alkaline negative electrode composite material. Accordingly, it is possible to appropriately form an SEI coating derived from LiBOB, and minimize the initial resistance of the produced battery.

The oxalate complex lithium salt is acidic in an aqueous solvent. However, in the production method according to the present embodiment, since the alkaline negative electrode composite material including an alkaline component is prepared, the acid generated when the oxalate complex lithium salt is added is neutralized, and the negative electrode composite material has a pH that is near neutral (pH 6.7 to pH 7.2, for example, pH 7). Accordingly, it is possible to prevent decomposition of the binder according to the addition of the oxalate complex lithium salt.

3. Negative Electrode Active Material Layer Formation Process

Next, the negative electrode active material layer formation process (S30) will be described. In this process, when the negative electrode composite material obtained as described above is applied to the negative electrode current collector and then dried, a negative electrode in which the negative electrode active material layer is formed on a surface (one surface or both surfaces) of the negative electrode current collector is produced. Here, as the negative electrode current collector used here, a negative electrode current collector (for example, a copper foil) used for a general lithium ion secondary battery in the related art can be used. In addition, as a method of applying a negative electrode composite material to a negative electrode current collector, the same methods as known in the related art can be used. For example, coating using a slit coater, a die coater, a comma coater, a gravure coater, a dip coater or the like is preferable. In addition, as a method of drying a negative electrode composite material, a method in which, for example, a negative electrode current collector to which a negative electrode composite material is applied is housed in a drying furnace and heated may be exemplified. A drying temperature and a drying time in this case are not particularly limited, but may be appropriately determined according to an amount of the aqueous solvent included in the negative electrode composite material and an amount of the negative electrode composite material applied to the negative electrode current collector.

According to the present embodiment, as described above, since the alkaline negative electrode composite material including the alkaline component is prepared in advance, the acid generated when the oxalate complex lithium salt is added is neutralized, and decomposition of the binder in the negative electrode composite material can be prevented. As a result, regardless of the oxalate complex lithium salt being added to the negative electrode active material layer, since the adhesive strength of the binder can be appropriately exhibited, the negative electrode active material layer is prevented from being separated from the negative electrode current collector, and it is possible to appropriately produce the negative electrode of the lithium ion secondary battery.

B. Production of Lithium Ion Secondary Battery.

Next, a method of producing a lithium ion secondary battery using the negative electrode produced according to the above processes will be described with reference to FIG. 2 and FIG. 3. Here, in the present embodiment, a method of producing a 5 V series battery in which a high potential positive electrode active material is used as a positive electrode active material will be described as a specific example.

Figure 2:
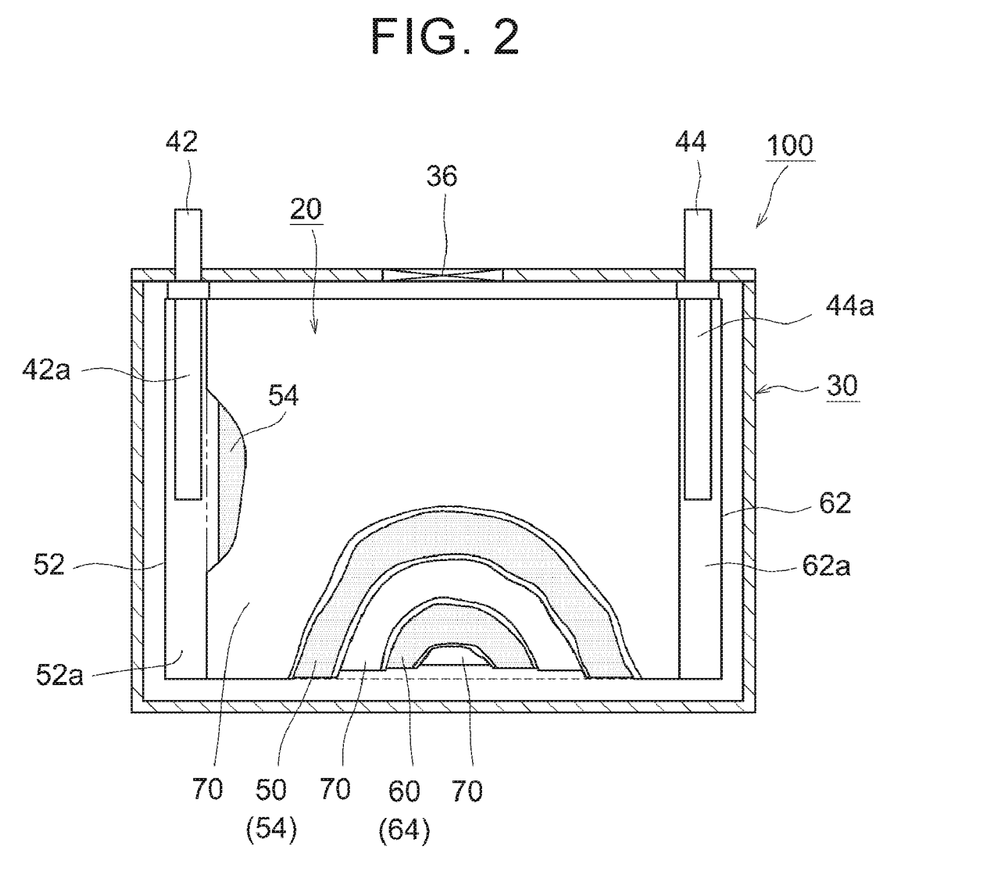
FIG. 2 is a cross-sectional view schematically showing a lithium ion secondary battery produced using the method of producing a lithium ion secondary battery according to the embodiment of the present disclosure.

A lithium ion secondary battery 100 shown in FIG. 2 has the same basic structure as that of a general lithium ion secondary battery, and is produced when a flat wound electrode body 20 and a nonaqueous electrolyte solution (not shown) are housed in a flat rectangular battery case 30. In the battery case 30, a positive electrode terminal 42 and a negative electrode terminal 44 for external connection, and a safety valve 36 for preventing the internal pressure in the battery case 30 from increasing are provided. In addition, the positive electrode terminal 42 is electrically connected to a positive electrode current collector 52 of a wound electrode body 20 through a positive electrode current collector plate 42a, and the negative electrode terminal 44 is electrically connected to a negative electrode current collector 62 through a negative electrode current collector plate 44a.

Figure 3:
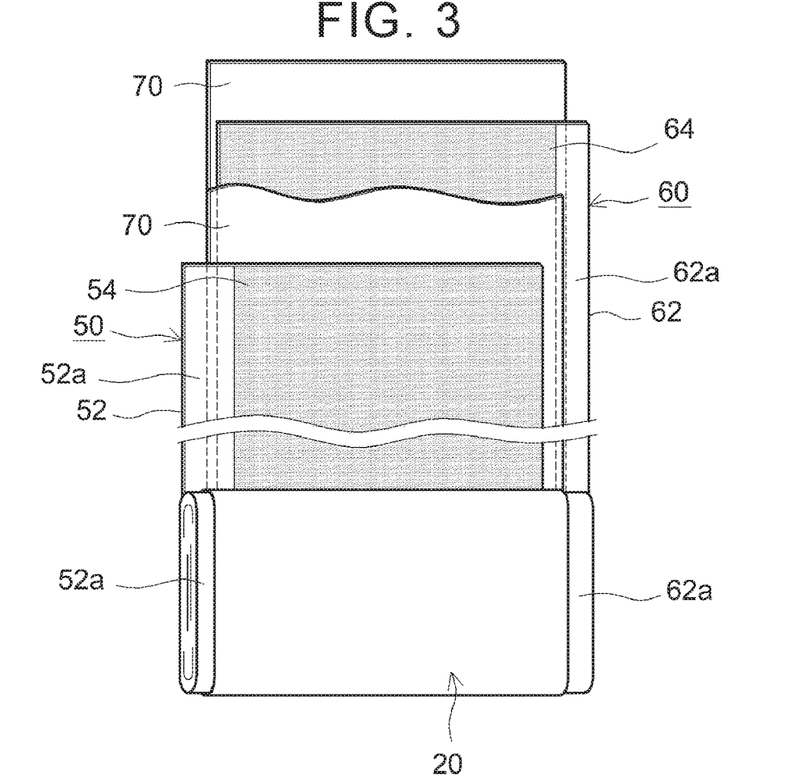
FIG. 3 is a perspective view schematically showing an electrode body of the lithium ion secondary battery shown in FIG. 2.

As shown in FIG. 3, the wound electrode body 20 is formed by laminating a sheet-like positive electrode 50 and a negative electrode 60 with a separator 70 therebetween, and then winding them in a longitudinal direction. The positive electrode 50 includes the elongated positive electrode current collector 52 and a positive electrode active material layer 54. The negative electrode 60 includes the elongated negative electrode current collector 62 and a negative electrode active material layer 64. Here, a positive electrode active material layer non-forming portion 52a in which the positive electrode current collector 52 is exposed is formed at one end of the wound electrode body 20 in the winding axis direction (sheet width direction), and a negative electrode active material layer non-forming portion 62a in which the negative electrode current collector 62 is exposed is formed at the other end thereof. Accordingly, the positive electrode active material layer non-forming portion 52a serves as a connecting portion with respect to the positive electrode current collector plate 42a (refer to FIG. 2), and the negative electrode active material layer non-forming portion 62a serves as a connecting portion with respect to the negative electrode current collector plate 44a.

The positive electrode 50 can be prepared when a paste-like positive electrode composite material into which a positive electrode active material and other additives (such as a binder and a conductive material) are mixed is applied to the surface of the positive electrode current collector 52 such as an aluminum foil and dried. When a 5 V series battery as in the present embodiment is produced, a high potential positive electrode active material is used as the positive electrode active material. The high potential positive electrode active material is a positive electrode active material having an operating voltage of 4.7 V or higher. For example, a composite oxide including Li, Ni, and Mn as essential elements is used. As a specific example of the high potential positive electrode active material, a lithium nickel manganese composite oxide having a spinel structure represented by a general formula: $Li_x(Ni_yMn_{2-y-z}M1_z)O_{4+\delta}$ may be exemplified. Here, in the above formula, M1 may be absent or may be any transition metal element or a typical metal element (for example, one or two or more selected from among Fe, Co, Cu, Cr, Zn and Al) other than Ni and Mn. Among them, M1 preferably includes at least one of trivalent Fe and Co. Alternatively, M1 may be a semimetallic element (for example, one or two or more selected from among B, Si and Ge) or a nonmetallic element. In addition, in the formula, x is $0.9 \leq x \leq 1.2$; y is $0 < y$; z is $0 \leq z$; $y+z<2$ (typically, $y+z \leq 1$); and $\delta$ is a value that is determined to satisfy electrically neutral conditions. In a preferable aspect, y is $0.2 \leq y \leq 1.0$ (more preferably $0.4 \leq y \leq 0.6$, for example, $0.45 \leq y \leq 0.55$); z is $0 \leq z < 1.0$ (for example, $0 \leq z \leq 0.3$). As a particularly preferable specific example of the lithium nickel manganese composite oxide, $LiNi_{0.5}Mn_{1.5}O_4$ may be exemplified.

Meanwhile, in the present embodiment, as the negative electrode 60 in FIG. 3, the negative electrode produced according to "A. Production of negative electrode" described above is used. As described above, in the negative electrode, regardless of the oxalate complex lithium salt being included in the negative electrode active material layer, decomposition of the binder is prevented, and the negative electrode active material layer is prevented from being separated from the negative electrode current collector.

In addition, as the separator 70, a porous sheet (film) made of, for example, polyethylene (PE), polypropylene (PP), polyester, cellulose, or polyamide resin may be exemplified. The porous sheet may have a single layer structure or a laminate structure with two or more layers (for example, a three-layer structure in which a PP layer is laminated on both surfaces of a PE layer). In addition, a heat resistant layer (HRL) may be provided on a surface of the separator 70.

The nonaqueous electrolyte solution is prepared when a supporting salt is incorporated into an organic solvent (a nonaqueous solvent). Further, when the 5 V series battery as in the present embodiment is produced, a fluorinated solvent is used as the nonaqueous solvent of the nonaqueous electrolyte solution. Since the fluorinated solvent has a high oxidation resistance (that is, the oxidative decomposition potential is high) solvent, even if the potential of the positive electrode is increased by the use of the high potential positive electrode active material, it is possible to prevent oxidative decomposition of the nonaqueous electrolyte solution in the positive electrode. As the fluorinated solvent, fluoride carbonates (fluorine-containing nonaqueous solvents) of ethers, esters, nitriles, sulfones, and lactones may be exemplified. For example, a fluorinated cyclic carbonate such as fluoroethylene carbonate (FEC) and a fluorinated linear carbonate such as methyl (2, 2, 2-trifluoroethyl) carbonate (MTFEC) can be suitably used. Here, the nonaqueous solvents can be used alone or in an appropriate combination of two or more thereof. In addition, as the supporting salt, for example, a lithium salt such as $LiPF_6$, and $LiBF_4$ can be suitably used. The concentration of the supporting salt is preferably 0.7 mol/L to 1.3 mol/L. Here, the nonaqueous electrolyte solution may include various additives such as a gas generating agent, a dispersant, and a thickener in addition to the fluorinated solvent and the supporting salt described above.

Then, in the production method according to the present embodiment, the positive electrode terminal 42 and the negative electrode terminal 44 are connected to the wound electrode body 20 including the positive electrode 50 and the negative electrode 60, the wound electrode body 20 is housed in the battery case 30 together with the nonaqueous electrolyte solution, and the battery case 30 is then sealed. Accordingly, the lithium ion secondary battery (5 V series battery) 100 in which the high potential positive electrode active material is used as the positive electrode active material, and the fluorinated solvent is used as the nonaqueous electrolyte solution is produced.

Then, the lithium ion secondary battery 100 produced as described above undergoes an initial charging process in order for the battery to actually be usable as a battery. According to the initial charging process, the oxalate complex lithium salt included in the negative electrode active material layer 64 is electrically decomposed, and the SEI coating derived from the oxalate complex lithium salt is formed on the surface of the negative electrode active material. Here, in the initial charging process, for example, it is preferable that the maximum achievable potential be set to be higher than an oxidation-reduction potential of the oxalate complex lithium salt and lower than an oxidation-reduction potential of the nonaqueous electrolyte solution. Accordingly, it is possible to appropriately form the SEI coating derived from the oxalate complex lithium salt without consuming lithium ions in the nonaqueous electrolyte solution. Here, the number of times the initial charging process is performed is not particularly limited, and the initial charging process may be performed twice or more with a discharge therebetween.

As described above, in the production method according to the present embodiment, when the negative electrode is produced, if the alkaline negative electrode composite material with a pH that is adjusted to be alkaline in advance is prepared, it is possible to prevent decomposition of the binder due to the acid generated when the oxalate complex lithium salt is added. As a result, regardless of the oxalate complex lithium salt being added to the negative electrode active material layer, since the adhesive strength of the binder can be appropriately exhibited, the negative electrode active material layer is prevented from being separated from the negative electrode current collector, and it is possible to appropriately produce the negative electrode of the lithium ion secondary battery. Therefore, in the lithium ion secondary battery produced according to the production method according to the present embodiment, since the oxalate complex lithium salt is included in the negative electrode active material layer, the SEI coating derived from the oxalate complex lithium salt can be appropriately formed on the surface of the negative electrode active material in the initial charging process, and it is possible to increase the capacity retention rate.

Furthermore, as described above, the production method disclosed here can be preferably used for the 5 V series battery in which the fluorinated solvent described above is used. Accordingly, also in the 5 V series battery in which the fluorinated solvent in which the oxalate complex lithium salt does not easily dissolve is used, the SEI coating derived from the oxalate complex lithium salt can be appropriately formed on the surface of the negative electrode active material.

Here, as shown in FIG. 2 and FIG. 3, while the lithium ion secondary battery 100 in which the wound electrode body 20 is housed in the flat rectangular battery case 30 has been exemplified in the above embodiment, the method of producing a lithium ion secondary battery disclosed here can be used when a lithium ion secondary battery having a structure other than the above structure is produced. For example, as the electrode body, a laminated electrode body in which a plurality of sheet-like positive electrodes and negative electrodes are laminated with separators therebetween can be used. In addition, the shape of the battery case can be appropriately changed according to the shape of the electrode body. For example, a cylindrical shape, a coin shape, a laminated shape, and the like can be used.

In addition, the method of producing a 5 V series battery in which the fluorinated solvent is used as the nonaqueous electrolyte solution and the high potential positive electrode active material is used as the positive electrode active material has been described in the above embodiment. However, the production method disclosed here is not limited to the method of producing a 5 V series battery. For example, the production method disclosed here can also be used for a battery in which neither the fluorinated solvent nor the high potential positive electrode active material used. In this case, it is possible to appropriately form the SEI coating derived from the oxalate complex lithium salt on the surface of the negative electrode active material without separation of the negative electrode active material layer.

Test Examples

While test examples of the present disclosure will be described below, the test examples are not intended to limit the present disclosure.

1. Production of samples. An alkaline negative electrode composite material was prepared as in the above embodiment. Then, an oxalate complex lithium salt was added to the alkaline negative electrode composite material. A negative electrode was produced using the negative electrode composite material. Then, 5 V series batteries (Sample 1 to Sample 17) were produced using the produced negative electrodes. Here, in this test example, when the alkaline negative electrode composite material was prepared, LiOH was used as an alkaline component and LiBOB was used as the oxalate complex lithium salt. Here, in Sample 1 to Sample 17, the amounts of LiOH and LiBOB added were different as shown in Table 1.

TABLE 1

| | Amount of LiOH added (wt %) | Amount of LiBOB added (M) |
|---|---|---|
| Sample 1 | 0.01 | 0 |
| Sample 2 | 0.01 | 0.02 |
| Sample 3 | 0.02 | 0.02 |
| Sample 4 | 0.025 | 0.02 |
| Sample 5 | 0.01 | 0.025 |
| Sample 6 | 0.02 | 0.025 |
| Sample 7 | 0.01 | 0.035 |
| Sample 8 | 0.02 | 0.035 |
| Sample 9 | 0.01 | 0.04 |
| Sample 10 | 0.02 | 0.04 |
| Sample 11 | 0.025 | 0.04 |
| Sample 12 | 0.01 | 0.045 |
| Sample 13 | 0.02 | 0.045 |

TABLE 1-continued

| | Amount of LiOH added (wt %) | Amount of LiBOB added (M) |
|---|---|---|
| Sample 14 | 0.01 | 0.045 |
| Sample 15 | 0.02 | 0.06 |
| Sample 16 | 0.025 | 0.06 |
| Sample 17 | 0 | 0.02 |

In addition, the samples were prepared under the same conditions except that the above amounts of LiOH and LiBOB added were different. Specifically, the spinel type lithium nickel manganese composite oxide ($LiNi_{0.5}Mn_{1.5}O_4$) which is a high potential positive electrode active material was used as the positive electrode active material. Acetylene black was used as the negative electrode active material. Then, as the nonaqueous electrolyte solution, a nonaqueous electrolyte solution in which $LiPF_6$ was added to a fluorinated solvent (fluoroethylene carbonate) was used.

2. Evaluation Test (1) Initial Resistance Ratio

Figure 4:
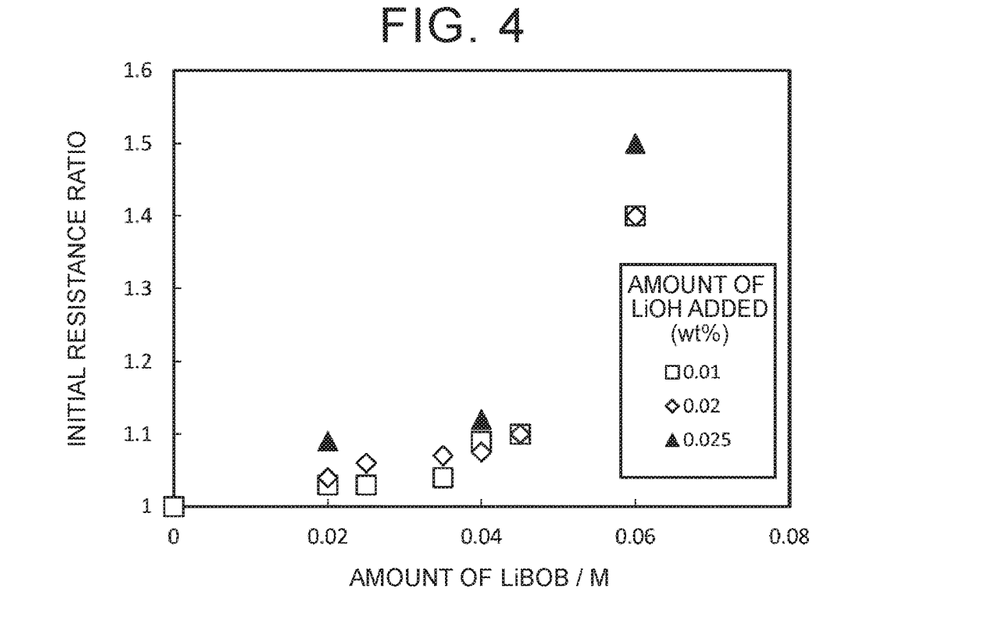
FIG. 4 is a graph showing initial resistance ratios of Sample 1 to Sample 16 in test examples.

A charge and discharge test was performed on the above batteries of Sample 1 to Sample 16 under the following conditions, and the initial resistance was obtained. Then, the initial resistance of Sample 1 was set to 1.0 as a reference. The ratio of the initial resistance of each of the samples to the initial resistance of Sample 1 (initial resistance ratio) was obtained. The calculated results of the initial resistance ratio are shown in FIG. 4. In FIG. 4, the horizontal axis represents the amount of LiBOB added, and the vertical axis represents the initial resistance ratio. Here, in Table 1, since the negative electrode active material layer separated and the initial resistance ratio was not obtained in Sample 17, the result of Sample 17 is not shown in FIG. 4. In the charge and discharge test when the initial resistance was obtained, first, charging (CC charging) was performed with a constant current of 2 C until the voltage between positive and negative electrode terminals reached 4.1 V, and was then stopped for 10 minutes. Next, discharging (CC discharging) was performed with a constant current of 2 C until the voltage between the positive and negative electrode terminals reached 3.0 V. Then, discharging (CV discharging) was performed at a constant voltage until the total discharging time reached 1.5 hours, and stopped for 10 minutes. This charging and discharging pattern was set as one cycle. Here, a total of 500 cycles were repeated.

(2) Capacity Retention Rate

Figure 5:
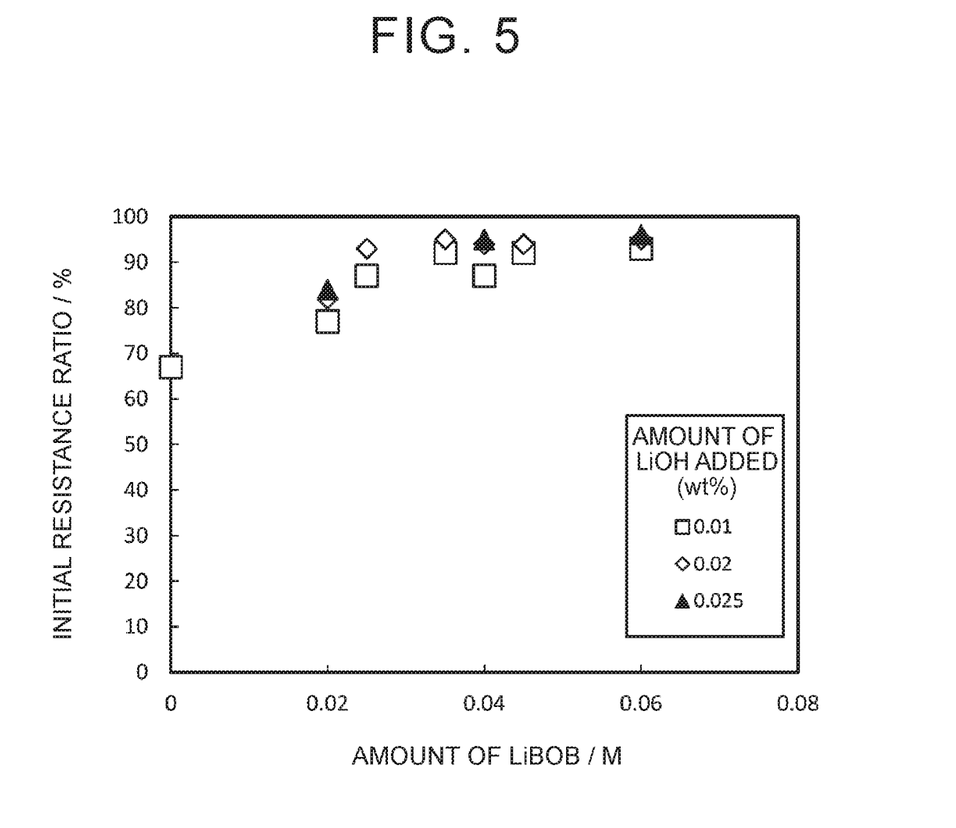
FIG. 5 is a graph showing capacity retention rates of Sample 1 to Sample 16 in test examples.

The batteries of Sample 1 to Sample 16 were subjected to constant current charging under the temperature condition of 25° C. at a charging rate of 1 C, adjusted to be in a charge state of SOC 80%, and then left under the temperature condition of 70° C. for 30 days. Then, a capacity at 3.0 to 4.1 V during CC charging (2 C) was measured and the capacity retention rate was obtained. The measurement results of the capacity retention rate are shown in FIG. 5. In FIG. 5, the horizontal axis represents the amount of LiBOB added, and the vertical axis represents the capacity retention rate (%). Here, in Table 1, since the negative electrode active material layer separated and the capacity retention rate was not obtained in Sample 17, the result of Sample 17 is not shown in FIG. 5.

3. Test Results

Unlike Sample 17, in all of the batteries of Samples 2 to 16, regardless of the oxalato complex lithium salt (LiBOB) being added to the negative electrode active material layer, the negative electrode active material layer did not separate, and it was possible to appropriately produce the lithium ion secondary battery. From this result, it was confirmed that, when the negative electrode composite material was prepared, if the alkaline negative electrode composite material including LiOH was prepared, it was possible to prevent decomposition of the binder due to the acid generated when LiBOB was added to the negative electrode composite material, the negative electrode active material layer was prevented from being separated, and it was possible to appropriately produce the lithium ion secondary battery.

Then, the initial resistance ratio and the capacity retention rate of the produced lithium ion secondary batteries were checked. As a result, it was found that, when the amount of LiBOB added increased, the capacity retention rate (%) increased, but the initial resistance tended to decrease as shown in FIG. 4 and FIG. 5. Therefore, in consideration of the relationship between the capacity retention rate and the initial resistance, it was confirmed that an amount of LiBOB added was preferably 0.02 M to 0.045 M. Meanwhile, it was found that, when the amount of LiOH added increased, the capacity retention rate (%) increased, but the initial resistance tended to decrease. Therefore, it was confirmed that the amount of LiOH added was preferably 0.02 wt % to 0.025 wt %.

While specific examples of the present disclosure have been described above in detail, these are only examples, and do not limit the scope of the appended claims. The technical scope described in the appended claims include various modifications and alternations of the specific examples described above.

What is claimed is:

1. A method of producing a lithium ion secondary battery comprising:
   preparing an alkaline negative electrode composite material including a negative electrode active material, a binder, an alkaline component, and an aqueous solvent;
   adding an oxalate complex lithium salt that is acidic in the aqueous solvent to the alkaline negative electrode composite material; and
   applying the negative electrode composite material to which the oxalate complex lithium salt has been added to a surface of a negative electrode current collector and drying the negative electrode composite material to form a negative electrode active material layer,
   wherein the negative electrode composite material to which the oxalate complex lithium salt has been added has a pH of 6.7 to 7.2.

2. The method of producing a lithium ion secondary battery according to claim 1,
   wherein the alkaline component is lithium hydroxide.

3. The method of producing a lithium ion secondary battery according to claim 2,
   wherein the lithium hydroxide is included at 0.01 wt % or more with respect to 100 wt % of the alkaline negative electrode composite material.

4. The method of producing a lithium ion secondary battery according to claim 2,
   wherein the lithium hydroxide is included at 0.02 wt % or more with respect to 100 wt % of the alkaline negative electrode composite material.

5. The method of producing a lithium ion secondary battery according to claim 2,
   wherein the lithium hydroxide is included at 0.02 wt % to 0.025 wt % with respect to 100 wt % of the alkaline negative electrode composite material.

6. The method of producing a lithium ion secondary battery according to claim 1,
   wherein the oxalate complex lithium salt is lithium bis(oxalato)borate.

7. The method of producing a lithium ion secondary battery according to claim 6,
   wherein the lithium bis(oxalato)borate is added to the alkaline negative electrode composite material so that the lithium bis(oxalato)borate is included at 0.025 M to 0.045 M with respect to the alkaline negative electrode composite material.

8. The method of producing a lithium ion secondary battery according to claim 6,
   wherein the lithium bis(oxalato)borate is added to the alkaline negative electrode composite material so that the lithium bis(oxalato)borate is included at 0.025 M to 0.04 M with respect to the alkaline negative electrode composite material.

9. The method of producing a lithium ion secondary battery according to claim 1,
   wherein, in an initial charging process, the oxalate complex lithium salt included in the negative electrode active material layer is electrically decomposed, and a solid electrolyte interface derived from the oxalate complex lithium salt is formed on a surface of the negative electrode active material.

10. The method of producing a lithium ion secondary battery according to claim 9,
    wherein, in the initial charging process, a maximum achievable potential is set to be higher than an oxidation-reduction potential of the oxalate complex lithium salt and lower than an oxidation-reduction potential of a nonaqueous electrolyte solution.

* * * * *